(12) United States Patent
Briand et al.

(10) Patent No.: US 6,723,956 B2
(45) Date of Patent: Apr. 20, 2004

(54) PULSED-ARC WELDING PROCESS AND DEVICE

(75) Inventors: Francis Briand, Paris (FR); Christophe Mas, Paris (FR); Georges Caillibotte, Acheres (FR); Jean-Pierre Eyschen, La Frette sur Seine (FR)

(73) Assignees: L'Air Liquide - Societe Anonyme a Directoire et Conseil de Surveillance pour l'Etude Exploitation des Procedes Georges Claude, Paris Cedex 07 (FR); La Soudure Autogene Francaise, Paris Cedex 07 (FR)

( * ) Notice: Subject to any disclaimer, the term of this patent is extended or adjusted under 35 U.S.C. 154(b) by 33 days.

(21) Appl. No.: 10/023,870

(22) Filed: Dec. 21, 2001

(65) Prior Publication Data

US 2002/0130117 A1 Sep. 19, 2002

(30) Foreign Application Priority Data

Dec. 21, 2000 (FR) .............................. 0016759

(51) Int. Cl.⁷ ................................. B23K 9/09
(52) U.S. Cl. ............................. 219/137 PS; 219/130.51
(58) Field of Search ...................... 219/137 PS, 130.51, 219/130.5, 137.71

(56) References Cited

U.S. PATENT DOCUMENTS

| | | | | |
|---|---|---|---|---|
| 5,525,778 A | * | 6/1996 | Matsui et al. | .......... 219/130.51 |
| 5,670,071 A | | 9/1997 | Ueyama et al. | |

FOREIGN PATENT DOCUMENTS

| | | |
|---|---|---|
| DE | 31 03 247 | 1/1982 |
| DE | 37 42 402 | 7/1989 |
| EP | 0 043 588 | 1/1982 |

* cited by examiner

Primary Examiner—Clifford C. Shaw
(74) Attorney, Agent, or Firm—Young & Thompson

(57) ABSTRACT

Process for the arc welding in pulsed mode of one or more workpieces made of carbon steel, stainless steel, aluminum or aluminum alloy, with the use of a gas shield, in which an electric arc welding torch is supplied with at least one consumable wire at a wire feed speed ($V_{wire}$) and the consumable wire is subjected to current pulses, in order to melt the end of the consumable wire in which, for a given pulse frequency, a wire feed speed ($F_{wire}$), a mean current ($I_{mean}$) value and an rms current ($I_{rms}$) value are chosen, so as to detach one drop of molten metal per current pulse and to obtain a low degree of spatter.

14 Claims, 1 Drawing Sheet

Vf= 4m/min

PULSED-ARC WELDING PROCESS AND DEVICE

Figure 2:
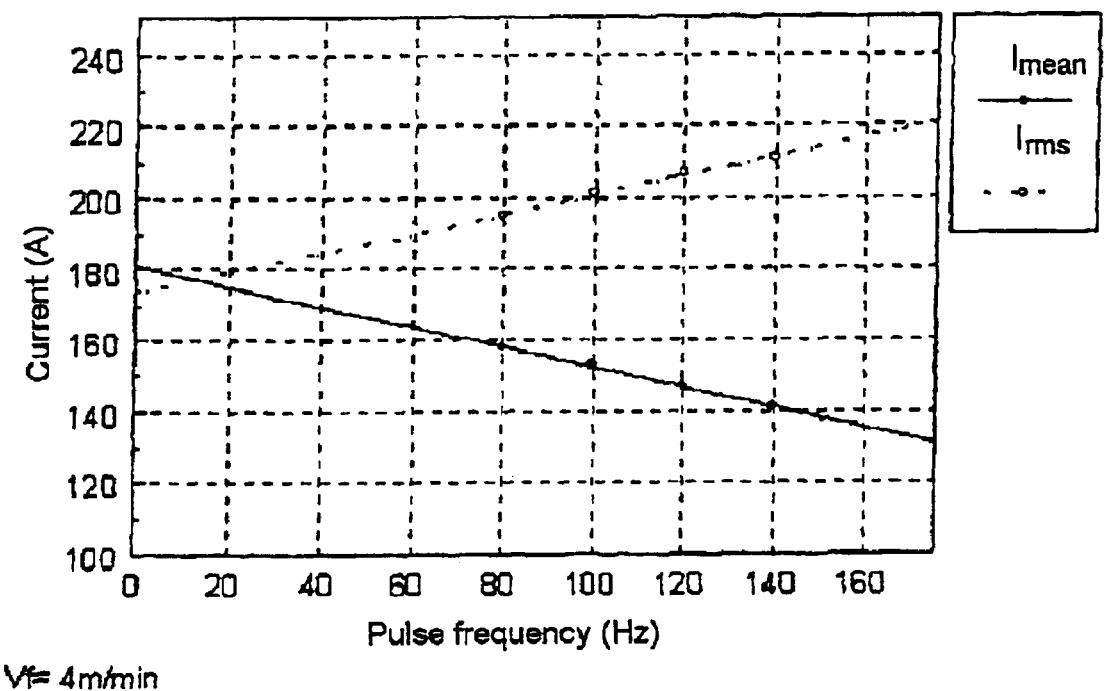

The present invention relates to a pulsed-arc welding process, device and unit, in particular to an MIG (Metal Inert Gas) or MAG (Metal Active Gas) welding process.

Arc welding in pulsed mode was developed to overcome the drawbacks of welding in globular mode which, because of its unstable transfer mechanism and its spattering character, does not allow productivity to be increased under acceptable welding conditions.

This is because in the arc welding of carbon steels and stainless steels, as soon as it is desired to increase the amount of metal deposited, while maintaining correct operating properties, it is necessary to increase the intensity of the current and, when a pulsed mode is not used, it is found that the process rapidly returns to globular mode.

However, the pulsed mode allows welding in a position which very often is impractical or difficult in globular mode.

Moreover, the non-spattering character of the pulsed mode, when the synergy of the various operating parameters is correct, makes it possible, especially on stainless steels, to reduce the finishing operation such as the removal of a spatter.

Furthermore, pulsed welding also has a wide field of application when it is compared with the axial spray mode which, by requiring quite a high welding current and resulting in a high deposition rate and a large weld pool, is generally used only on sizeable welding thicknesses and in the horizontal position, that is to say is limited to downhand welding.

The pulsed mode, making it possible to reduce the welding energy for the same wire speed and therefore for the same amount of metal deposited, partly remedies these drawbacks and allows, depending on the joint to be produced, not only downhand welding but also positional welding with a transfer quality comparable to that of the spray mode.

The pulsed mode is also very widely used for welding light alloys, such as aluminium for example, for which the short-circuit mode and globular mode are difficult to put into practice because of the defects which they give rise to, namely porosity and incomplete fusion.

In this case, the pulsed mode makes it possible to weld correctly with energies allowing the welding of small thickness down to 1 mm and positional welding, whereas the conventionally employed spray mode is rather more synonymous with productivity.

Arc welding processes in spray mode or in pulsed mode are described in the following documents: WO-A-98/22247, EP-A-909 604, *Welding and Cutting* by P. Houldcroft and R. John, 1988, pp. 80–83, BE-A-817 637, JP-A-57 124 572, JP-A-56 134 075, JP-A-59 078 776, GB-A-2 268 009, U.S. Pat. Nos. 5,192,851, 3,528,100, 3,956,610, 5,432,317, 4,912,299, 5,672,286, 4,366,362 and EP-A-422 763.

In general, in pulsed mode, the current pulse may adopt various waveforms. The trapezoidal waveform is however virtually the only one to be used on an industrial scale and is, in general, characterized by the parameters indicated in FIG. 1 appended hereto.

If it is desired to make pulsed MIG/MAG welding accessible to most operators, it is necessary to produce what are called synergic curves or welding programs.

The setting-up of a pulsed-current synergic control system consists in determining, for each wire according to its nature and its diameter, for each shielding gas and for each wire feed speed, values of the parameters describing the current pulse which best satisfy the criteria by which the welding operation is judged.

This determination is quite difficult to carry out as it, in general, is empirical and can only be accomplished by means of numerous trials.

However, this is the indispensable condition to the dissemination and utilization of a welding process so that the welding operator has the minimum number of adjustments to make.

Thus, conventionally the operator chooses the wire/gas pair and, depending on the desired wire feed speed, the previously determined synergic curve is used to assign the correct values to the current pulse parameters.

In general, a good pulsed-current synergic control system must comprise single drop detachment per pulse, be spatter free and have the smallest possible arc height.

The setting-up of the synergic control system or program requires having to choose the values to be assigned to the pulse parameters in the knowledge that:
  the peak current ($I_p$) cannot be less than a certain threshold if it is desired that the drop becomes detached, this threshold being given by the value of the current for which the spray mode starts in consumable-electrode gas-shield DC welding; and
  if it is desired for there to be no spatter, detachment of the drop must occur at limited current levels.

Moreover, once this work has been done for several wire feed speeds, it is necessary to ensure any change, depending on the wire feed speed, in the parameters describing the current pulse is not too abrupt.

This is because the operator is free to choose the wire feed speed, and this speed does not always correspond to the wire feed speeds that were used to describe the synergic curve.

In this case, the values of the pulse parameters must be interpolated from the synergic curves and, if these are too abrupt, the welding result obtained may not be satisfactory and it is then necessary to start again.

To determine the synergic curves is therefore usually quite difficult and requires many welding trials to be carried out, the number being greater the more numerous the parameters to be taken into account, since the more parameters there are to be considered, the more possible combinations there are of these various parameters among themselves and therefore the more trials there are to be carried out, without having to be certain of the result which will stem therefrom.

The problem that therefore arises is to have a pulsed-arc welding process which allows carbon steels, stainless steels, aluminium or aluminium alloys to be welded effectively and which avoids having to carry out numerous welding trials in order to determine the welding conditions and parameters which give good welding results, in particular the wire feed speed and the set of parameters describing the current pulses which have to be applied for the chosen wire feed speed, namely the mean current value and the rms current value.

Plus, it is a first object of the present invention therefore to provide a process for the arc welding in pulsed mode of carbon steels, stainless steels, aluminium or aluminium alloys, with the use of a gas shield, exhibiting great flexibility and giving satisfactory results in terms of welding quality.

It is a second object of the present invention therefore to provide a MIG or MAG arc welding process in pulsed mode, allowing easy determination, depending on the desired wire feed speed, of the set of parameters describing the current pulses, mainly the mean current ($I_{mean}$) value and the rms current ($I_{rms}$) value, which have to be applied so that good welding results are obtained.

Thus, the present invention relates to a process for the arc welding in pulsed mode of one or more workpieces made of carbon steel, stainless steel, aluminium or aluminium alloy, with the use of a gas shield, in which an electric arc welding torch is supplied with at least one consumable wire at a wire feed speed ($V_{wire}$) and the said consumable wire is subjected to current pulses, in order to melt the end of the said consumable wire and to detach a drop of molten metal by a current impulse, and in which, for a given pulse frequency, a wire feed speed ($F_{wire}$), a mean current ($I_{mean}$) value and an rms current ($I_{rms}$) value such that:

$$I_{mean}=A_1V_{wire}+B_1, \text{ where } 5<A_1<45 \text{ and } 0<B_1<50$$

and $$I_{rms}=A_2V_{wire}+B_2, \text{ where } 5<A_2<45 \text{ and } 40<B_2<100,$$

where $I_{mean}$ and $I_{rms}$ are expressed in amps and $V_{wire}$ is expressed in m/min, are chosen and/or used.

Depending on the case, the process of the invention may include one or more of the following features:

the workpiece or workpieces to be welded are made of carbon steel and in that the mean current ($I_{mean}$) value and the rms current ($I_{rms}$) value, such that:

$$I_{mean}=A_1V_{wire}+B_1, \text{ where } 20<A_1<40 \text{ and } 0<B_1<30$$

and $$I_{rms}=A_2V_{wire}+B_2, \text{ where } 19<A_2<39 \text{ and } 40<B_2<100$$

are chosen;

the workpiece or workpieces to be welded are made of stainless steel and in that the mean current ($I_{mean}$) value and the rms current ($I_{rms}$) value, such that:

$$I_{mean}=A_1V_{wire}+B_1, \text{ where } 10<A_1<40 \text{ and } 0<B_1<40$$

and $$I_{rms}=A_2V_{wire}+B_2, \text{ where } 9<A_2<39 \text{ and } 40<B_2<100$$

are chosen;

the workpiece or workpieces to be welded are made of aluminium or aluminium alloy and in that the mean current ($I_{mean}$) value and the rms current ($I_{rms}$) value, such that:

$$I_{mean}=A_1V_{wire}+B_1, \text{ where } 5<A_1<30 \text{ and } 0<B_1<20$$

and $$I_{rms}=A_2V_{wire}+B_2, \text{ where } 5<A_2<25 \text{ and } 40<B_2<65$$

are chosen;

the wire feed speed ($V_{wire}$) is between 1 and 20 m/min, preferably between 2 and 15 m/min;

the pulse frequency is between 20 and 300 Hz, preferably between 50 and 200 Hz;

the ratio ($I_{rms}/I_{mean}$) of the rms current ($I_{rms}$) value to the mean current ($I_{mean}$) value is between 1.05 and 2, preferably between 1.1 and 1.8;

the workpiece or workpieces to be welded are made of carbon steel and in that the ratio ($I_{rms}/I_{mean}$) of the rms current ($I_{rms}$) value to the mean current ($I_{mean}$) value is between 1.05 and 2, preferably between 1.05 and 1.6;

the workpiece or workpieces to be welded are made of stainless steel and in that the ratio ($I_{rms}/I_{mean}$) of the rms current ($I_{rms}$) value to the mean current ($I_{mean}$) value is between 1.05 and 2, preferably between 1.1 and 1.8;

the workpiece or workpieces to be welded are made of aluminium or aluminium alloy and in that the ratio ($I_{rms}/I_{mean}$) of the rms current ($I_{rms}$) value to the mean current ($I_{mean}$) value is between 1.05 and 2, preferably between 1.05 and 1.5;

the workpiece or workpieces to be welded have a thickness of 0.5 mm to 10 mm, preferably 0.8 to 6 mm;

the gas shield consists of a gas or gas mixture chosen from helium, argon, carbon dioxide, oxygen, nitrogen and hydrogen;

the consumable wire has a diameter of between 0.6 mm and 2.2 mm, preferably between 0.8 mm and 1.6 mm;

the welding is of the pulsed MIG or pulsed MAG type; and the wire is a solid wire or a flux-cored wire.

The invention also relates to a pulsed arc welding device, capable of implementing a process, comprising:

frequency selection means for setting, adjusting or selecting a pulse frequency;

wire speed selection means for setting, adjusting or selecting a wire feed speed ($V_{wire}$);

means for determining the mean current ($I_{mean}$) and rms current ($I_{rms}$) values making it possible to determine or calculate at least one mean current ($I_{mean}$) value and at least one rms current ($I_{rms}$) value such that:

$$I_{mean}=A_1V_{wire}+B_1, \text{ where } 5<A_1<45 \text{ and } 5<B_1<50$$

and $$I_{rms}=A_2V_{wire}+B_2, \text{ where } 5<A_2<45 \text{ and } 45<B_2<110,$$

where $I_{mean}$ and $I_{rms}$ are expressed in amps and $V_{wire}$ is expressed in m/min, and current adjustment means for adjusting the welding current in response to the determination or calculation of the mean current ($I_{mean}$) and rms current ($I_{rms}$) values by the said means for determining the mean current ($I_{mean}$) and rms current ($I_{rms}$) values.

The device of the invention may include or consist of at least one welding current generator.

Furthermore, the invention also relates to a welding unit comprising at least one device according to the invention, at least one welding torch, at least one source of welding wire and at least one source of shielding gas.

The inventors of the present invention have in fact demonstrated that, surprisingly, for a given wire/gas pair, a given wire speed ($V_{wire}$) and a given pulse frequency, all that is required is to choose mean current ($I_{mean}$) and rms current ($I_{rms}$) values corresponding to these parameters and values such as those given above in order to obtain operating parameters resulting in an effective pulsed welding process, that is to say a welding process which gives only one drop detachment per pulse, which is free of molten metal spatter and which makes it possible to maintain a constant arc height.

Figure 1:
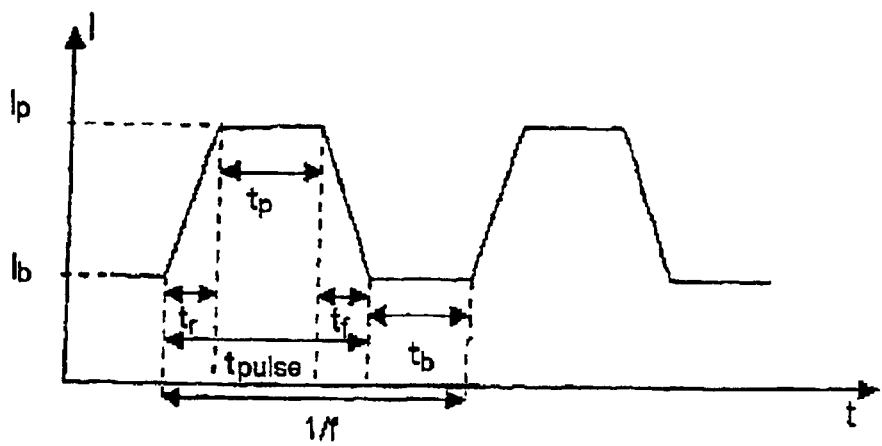

As mentioned above, in pulsed mode the current pulse may have various waveforms, but the trapezoidal waveform is practically the only one used on an industrial scale and is characterized by the parameters indicated in FIG. 1 appended hereto.

FIG. 1 shows two successive current pulses of trapezoidal waveform, the x-axis representing time (t) in milliseconds and the y-axis representing the intensity (I) of the current in amps.

Each current pulse is formed from:
a current rising edge from a background current ($I_b$) value to a peak current ($I_p$) value over a current rise time ($t_r$);
a peak current plateau forming the top of the trapezium over a pulse peak time ($t_p$) during which the drop of molten metal at the end of the wire detaches; and
a current falling edge from the peak current ($I_p$) value down to the background current ($I_b$) value over a current fall time ($t_f$) which may or may not be equal to the current rise time ($t_r$).

The sum of the durations of the current rise time ($t_r$), the current peak time ($t_p$) and the current fall time ($t_f$) constitutes the pulse time ($t_{pulse}$).

A trapezoidal pulse is separated from the next pulse by a background current plateau over a background time ($t_b$).

The sum of the durations of the pulse time ($t_{pulse}$) and the background time ($t_b$) constitutes the inverse of the frequency (1/f), f being expressed in hertz.

To be able to achieve the process of the present invention, several trials were carried out by the inventors, these being given in the examples below.

Trials

Table I below gives several sets of parameters obtained for a wire speed ($V_{wire}$) of 4 m/min, a frequency (f) of 80 Hz and a current pair ($I_{mean}$, $I_{rms}$) where $I_{mean}$=146 A and $I_{rms}$=188 A, giving similar welding results in the pulse welding of two carbon steel workpieces.

TABLE I

| $I_b$ (A) | 97 | 85 | 74 | 69 |
|---|---|---|---|---|
| $I_p$ (A) | 536 | 430 | 420 | 354 |
| $t_{pulse}$ (ms) | 0.4 | 1.2 | 0.8 | 2.4 |
| $t_r = t_f$ (ms) | 1 | 1 | 1.8 | 1 |

In light of this Table I, the inventors have observed that, for the same wire/gas pair, the same wire feed speed ($V_{wire}$) and the same pulse frequency, there exists only a narrow range of variations in the current pair ($I_{mean}$, $I_{rms}$) in which the drop is transferred correctly and that, within this range, if the value $I_{mean}$ is increased, the value of $I_{rms}$ would have to be decreased in order to maintain the effectiveness of the welding process.

Put another way, outside a current pair (minimum $I_{mean}$, maximum $I_{rms}$), metal transfer from the wire to the welded joint cannot take place without a short circuit and outside a current pair (maximum $I_{mean}$, minimum $I_{rms}$) detachment of the drops becomes erratic and results in the appearance of large drops of molten metal, which is not desirable.

Table II below indicates, as an example, the limiting current pairs determined for a wire speed ($V_{wire}$) of 4 m/min and a pulse frequency of 100 Hz; it should be noted that these limiting current pairs also maintain the arc height.

TABLE II

| $I_{mean}$ (A) | $I_{rms}$ (A) |
|---|---|
| 128 | 215 |
| 143 | 195 |

Based on this, the inventors of the invention also studied the variation in the operating current pair ($I_{mean}$, $I_{rms}$) as a function of the pulse frequency, while maintaining an arc height as short as possible (about 3 to 4 mm) and for the same wire feed speed.

The variation in this current pair is shown in FIG. 2 for a speed of 4 m/min.

It is apparent from the results obtained that it is not possible to keep the same current pair ($I_{mean}$; $I_{rms}$) for a long time when the frequency is varied and that, when this frequency is reduced, the difference between $I_{mean}$ and $I_{rms}$ decreases.

However, it appears that there is a minimum frequency below which and a maximum frequency above which it is difficult to carry out the process.

These limits are fixed by the diameter of the drop obtained, the lower frequency limit being fixed for a drop diameter about 1.2 times the wire diameter and the upper frequency limit for a drop diameter about 0.8 times the wire diameter.

It follows from these trials that all the parameters describing the current pulse, for a given wire/gas pair and a given wire speed ($V_{wire}$) may be included within an area lying within the space defined by $I_{mean}$ and $I_{rms}$ and that this area may be determined by a few simple experiments, by determining a current pair ($I_{mean}$, $I_{rms}$) which works for a frequency giving a drop diameter of the order of magnitude of the wire diameter, by a frequency excursion, by determining the current pair ($I_{mean}$, $I_{rms}$) for the limiting frequencies and by determining the limiting current pairs above and below which, for these limiting frequencies, detachment is no longer correct.

The variation in the $I_{mean}$ and $I_{rms}$ values as a function of the wire speed ($V_{wire}$) were obtained with a consumable wire sold by La Soudure Autogène Francaise under the name NERTALIC™ 70S having a diameter of 1.2 mm and with the use of a shielding gas sold by L'Air Liquide under the name ARCAL™ 21 (an Ar/$CO_2$ mixture).

It has been demonstrated that the variation is virtually linear over the entire wire speed range in question.

In this case, the current pairs were determined for wire speeds ($V_{wire}$) of 2 m/min and 8 m/min and for a frequency, for each wire speed, corresponding to a constant theoretical drop diameter of 0.88 times the wire diameter.

By proceeding in this manner, the inventors have been able to determine the set of operating points for all the wire/gas pairs in pulsed MIG/MAG welding, for a given pulse frequency and a given wire feed speed ($V_{wire}$), and have therefore determined that, to obtain effective welding, it is necessary to choose a mean current ($I_{mean}$) value and an rms current ($I_{rms}$) value such that:

$$I_{mean}=A_1 V_{wire}+B_1, \text{ where } 5<A_1<45 \text{ and } 0<B_1<50$$

and $$I_{rms}=A_2 V_{wire}+B_2, \text{ where } 5<A_2<45 \text{ and } 40<B_2<100,$$

where $I_{mean}$ and $I_{rms}$ are expressed in amps and $V_{wire}$ is expressed in m/min.

What is claimed is:

1. Process for the arc welding in pulsed mode of one or more workpieces made of carbon steel, stainless steel, aluminum or aluminum alloy, with the use of a gas shield, in which an electric arc welding torch is supplied with at least one consumable wire at a wire feed speed ($V_{wire}$) and the consumable wire is subjected to current pulses, in order to melt the end of the consumable wire and to detach a drop of molten metal by a current impulse, and in which, for a given pulse frequency, a wire feed speed ($V_{wire}$), a mean current ($I_{mean}$) value and an rms current ($I_{rms}$) value such that:

$$I_{mean}=A_1 V_{wire}+B_1, \text{ where } 5<A_1<45 \text{ and } 0<B_1<50$$

and $$I_{rms}=A_2 V_{wire}+B_2, \text{ where } 5<A_2<45 \text{ and } 40<B_2<100,$$

where $I_{mean}$ and $I_{rms}$ are expressed in amps and $V_{wire}$ is expressed in m/min, are chosen, and wherein:

the wire feed speed ($V_{wire}$) is between 1 and 20 m/min; the pulse frequency is between 20 and 300 Hz; and the ratio ($I_{rms}/I_{mean}$) of the rms current $I_{rms}$ value to the mean current $I_{mean}$ value is between 1.05 and 2.

2. Process according to claim 1, wherein the workpiece or workpieces to be welded are made of carbon steel and the mean current ($I_{mean}$) value and the rms current ($I_{rms}$) value, such that:

$$I_{mean}=A_1 V_{wire}+B_1, \text{ where } 20<A_1<40 \text{ and } 0<B_1<30$$

and $$I_{rms}=A_2 V_{wire}+B_2, \text{ where } 19<A_2<39 \text{ and } 40<B_2<100,$$

where $I_{mean}$ and $I_{rms}$ are expressed in amps and $V_{wire}$ is expressed in m/min, are chosen.

3. Process according to claim 1, wherein the workpiece or workpieces to be welded are made of stainless steel and the mean current ($I_{mean}$) value and the rms current ($I_{rms}$) value, such that:

$$I_{mean}=A_1 V_{wire}+B_1, \text{ where } 10<A_1<40 \text{ and } 0<B_1<40$$

and $$I_{rms}=A_2 V_{wire}+B_2, \text{ where } 9<A_2<39 \text{ and } 40<B_2<100,$$

where $I_{mean}$ and $I_{rms}$ are expressed in amps and $V_{wire}$ is expressed in m/min, are chosen.

4. Process according to claim 1, wherein the workpiece or workpieces to be welded are made of aluminum or aluminum alloy and the mean current ($I_{mean}$) value and the rms current ($I_{rms}$) value, such that:

$$I_{mean}=A_1 V_{wire}+B_1, \text{ where } 5<A_1<30 \text{ and } 0<B_1<20$$

and $$I_{rms}=A_2 V_{wire}+B_2, \text{ where } 5<A_2<25 \text{ and } 40<B_2<65,$$

where $I_{mean}$ and $I_{rms}$ are expressed in amps and $V_{wire}$ is expressed in m/min, are chosen.

5. Process according to claim 1, wherein the wire feed speed ($V_{wire}$) is between 2 and 15 m/min.

6. Process according to claim 1, wherein the pulse frequency is between 50 and 200 Hz.

7. Process according to claim 1, wherein the ratio ($I_{rms}/I_{mean}$) of the rms current ($I_{rms}$) value to the mean current ($I_{mean}$) value is between 1.1 and 1.8.

8. Process according to claim 1, wherein the workpiece or workpieces to be welded are made of carbon steel and the ratio ($I_{rms}/I_{mean}$) of the rms current ($I_{rms}$) value to the mean current ($I_{mean}$) value is between 1.05 and 2.

9. Process according to claim 1, wherein the workpiece or workpieces to be welded are made of stainless steel and the ratio ($I_{rms}/I_{mean}$) of the rms current ($I_{rms}$) value to the mean current ($I_{mean}$) value is between 1.05 and 2.

10. Process according to claim 1, wherein the workpiece or workpieces to be welded are made of aluminum or aluminum alloy and the ratio ($I_{rms}/I_{mean}$) of the rms current ($I_{rms}$) value to the mean current ($I_{mean}$) value is between 1.05 and 2.

11. Process according to claim 1, wherein the gas shield consists of a gas or gas mixture selected from the group consisting of helium, argon, carbon dioxide, oxygen, nitrogen and hydrogen and the consumable wire has a diameter of between 0.6 mm and 2.2 mm.

12. Process according to claim 1, wherein the welding is of the pulsed MIG or pulsed MAG type and the wire is a solid wire or a flux-cored wire.

13. Pulsed arc welding device, capable of implementing a process according to claim 1, comprising:

frequency selection means for setting, adjusting or selecting a pulse frequency;

wire speed selection means for setting, adjusting or selecting a wire feed speed ($V_{wire}$)

means for determining the mean current ($I_{mean}$) and rms current ($I_{rms}$) values making it possible to determine or calculate at least one mean current ($I_{mean}$) value and at least one rms current ($I_{rms}$) value such that:

$$I_{mean}=A_1 V_{wire}+B_1, \text{ where } 5<A_1<45 \text{ and } 5<B_1<50$$

and $$I_{rms}=A_2 V_{wire}+B_2, \text{ where } 5<A_2<45 \text{ and } 45<B_2<110,$$

where $I_{mean}$ and $I_{rms}$ are expressed in amps and $V_{wire}$ is expressed in m/min; and current adjustment means for adjusting the welding current in response to the determination or calculation of the mean current ($I_{mean}$) and rms current ($I_{rms}$) values by the means for determining the mean current ($I_{mean}$) and rms current ($I_{rms}$) values; and optionally at least one welding current generator.

14. Welding unit comprising at least one device according to claim 13, at least one welding torch, at least one source of welding wire and at least one source of shielding gas.

* * * * *